United States Patent
Jung et al.

(10) Patent No.: US 9,621,620 B2
(45) Date of Patent: Apr. 11, 2017

(54) APPARATUS AND METHOD FOR PROVIDING CONTENT WITH A DISTRIBUTED ARCHITECTURE, AND SYSTEM FOR PROVIDING CONTENT WITH THE SAID APPARATUS

(71) Applicant: Electronics and Telecommunications Research Institute, Daejeon (KR)

(72) Inventors: Woo Sug Jung, Daejeon (KR); Jong Dae Park, Daejeon (KR); Tae Soo Chung, Daejeon (KR); Byung Ho Yae, Daejeon (KR); Sung Kee Noh, Daejeon (KR); Sung Jin Moon, Daejeon (KR); Nam Seok Ko, Daejeon (KR); Hwan Jo Heo, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 917 days.

(21) Appl. No.: 13/941,083

(22) Filed: Jul. 12, 2013

(65) Prior Publication Data

US 2014/0082135 A1    Mar. 20, 2014

(30) Foreign Application Priority Data

Sep. 14, 2012  (KR) .................. 10-2012-0102423
Apr. 9, 2013   (KR) .................. 10-2013-0038677

(51) Int. Cl.
*G06F 15/16* (2006.01)
*H04L 29/08* (2006.01)

(52) U.S. Cl.
CPC .......... *H04L 67/02* (2013.01); *H04L 67/1002* (2013.01); *H04L 67/1029* (2013.01); *H04L 67/2852* (2013.01)

(58) Field of Classification Search
CPC .. H04L 67/02; H04L 67/1002; H04L 67/2852
USPC ............................ 709/202–203, 217–219
See application file for complete search history.

(56) References Cited

U.S. PATENT DOCUMENTS

| | | | | |
|---|---|---|---|---|
| 5,548,724 A * | 8/1996 | Akizawa | ........... | G06F 17/30067 709/219 |
| 6,816,907 B1 * | 11/2004 | Mei | ...... | H04L 67/1012 709/229 |
| 8,738,736 B2 * | 5/2014 | Choi | .......... | H04L 67/1029 709/203 |
| 8,769,139 B2 * | 7/2014 | Dazzi | ............ | G06F 15/16 709/203 |
| 9,178,928 B2 * | 11/2015 | Choi | .......... | H04L 67/1029 |
| 9,363,312 B2 * | 6/2016 | Jensen | ........ | H04L 67/1029 |
| 2002/0116456 A1 * | 8/2002 | Morita | ........... | H04L 67/28 709/218 |
| 2006/0179153 A1 | 8/2006 | Lee et al. | | |

(Continued)

FOREIGN PATENT DOCUMENTS

KR    10-2009-0114705 A    11/2009

*Primary Examiner* — Bharat N Barot (57) ABSTRACT

The present invention provides content providing apparatus and method and a content providing system which maintains a compatibility with an IP network and deliver a content with a complete distributed architecture excluding the content synchronizing process and the request routing process which delivers the content.

14 Claims, 9 Drawing Sheets

(56) References Cited

U.S. PATENT DOCUMENTS

2011/0106878 A1* 5/2011 Cho ................. G06Q 30/02
709/203

* cited by examiner

APPARATUS AND METHOD FOR PROVIDING CONTENT WITH A DISTRIBUTED ARCHITECTURE, AND SYSTEM FOR PROVIDING CONTENT WITH THE SAID APPARATUS

CROSS-REFERENCE TO RELATED APPLICATIONS

This application claims priority to and the benefit of Korean Patent Application No. 10-2012-0102423 filed on Sep. 14, 2012 and 10-2013-0038677 filed on Apr. 9, 2013, in the Korean Intellectual Property Office, the entire contents of which are incorporated herein by reference.

TECHNICAL FIELD

The present invention relates to content providing apparatus and method and a content providing system including the apparatus. More specifically, the present invention relates to a content providing apparatus and method, and a content providing system which transmit a content requested in a wired or wireless network to a user.

BACKGROUND ART

As various smart apparatuses such as a smart phone or smart pad are provided to the user, internet traffic in a wired or wireless network is increased so that a network maintenance cost of a communication service provider is sharply increased. One of causes of a sudden increase of the internet traffic is induced by a specific content such as a video and thus the content service provider and a communication service provider provide a content delivery network CDN.

The content delivery network distributes the same content to all content servers and a user receives a necessary content from a nearest content server. The content delivery network according to the related art requires a process of synchronizing a content distribution server and a content server and a request routing process for selecting a content server which provides a content requested by the user. Such content synchronizing process and request routing process are internet traffic separated from the content delivery and thus undesirably becomes a burden of the network as the content type to be delivered and a requested content are increased. In order to solve the above problem, a content information based network such as a CCN (content centric network) has been studied but problems such as a compatibility with an IP network, a content information system, and a limitation in a routing table size using the content information still remain.

Korean Patent No. 715,143 discloses the related art of the present invention. However, the related art suggests only file splitting, merging, and reproducing technologies for streaming control to deliver a large amount of contents but cannot solve a content synchronizing problem in the CDN and a request routing problem for finding the content position. Further, the IP network interworking problem which is pointed out as a problem in the CCN cannot be solved.

SUMMARY OF THE INVENTION

The present invention has been made in an effort to provide content providing apparatus and method and a content providing system which maintain a compatibility with an IP network and deliver a content with a complete distributed architecture without performing the content synchronizing process and the request routing process which delivers the content. However, an object of the present invention is not limited to the above description and other objects which have not been mentioned above will be more apparent to those skilled in the art from a reading of the following description.

The present invention suggests a content providing apparatus including: a determining unit configured to determine whether a content requested through a user terminal is stored; an interrogating unit configured to if the content is not stored, interrogate another content providing apparatus in the same cluster whether the content is stored; a first processing unit configured to receive the content from the content providing apparatus which replies that the content is stored; and a second processing unit configured to transmit the stored content to the user terminal if the content is stored and if the content is not stored, stores the received content and transmit the content to the user terminal.

If there is one content providing apparatus which replies that the content is stored therein, the first processing unit receives the content from the content providing apparatus and if there are at least two content providing apparatuses which reply that the content is stored therein, the first processing unit receives the content from the nearest content providing apparatus.

The first processing unit calculates a distance to the content providing apparatus based on position information each of the content providing devices and determines the nearest content providing apparatus.

The interrogating unit interrogates a content providing server on a public IP network whether the content is stored.

If the content is not stored in at least one second content providing apparatus, the first processing unit receives the content from the content providing server and if the content is stored in another content providing apparatus in the same cluster, requests the content providing server to stop delivering the content.

The second processing unit counts the number of transmitting the content whenever the content is transmitted to the user terminal.

The second processing unit records an un-stored content which is not stored, in a content storing list, as a first content, if a reply is received from at least two content storing apparatuses which belong to the same cluster that the un-stored content is possessed therein, changes and records the un-stored content in the content storing list as a second content and if a reply is received from at least two content storing apparatus which belong to the same cluster that the un-stored content is possessed therein, changes and records the un-stored content in the content storing list as a second content.

The content providing apparatus may further include a third processing unit configured to delete a content which is being stored, delete the second content first using the content storing list and then delete a third content later.

If there are at least two second contents, the third processing unit deletes a content whose number of times of delivery to the user terminal is smaller, first.

The content providing apparatus may further include a storing unit configured to store the content; and a clustering unit configured to create a cluster in cooperation with other content providing apparatus or registers oneself an already configured cluster.

The present invention suggests a content providing method, including determining whether a content requested through a user terminal is stored; interrogating, if the content is not stored, another content providing apparatus in the same cluster whether the content is stored; first processing to receive the content from the content providing apparatus which replies that the content is stored; and second processing to transmit the stored content to the user terminal if the content is stored and if the content is not stored, stores the received content and transmit the content to the user terminal.

If there is one content providing apparatus which replies that the content is stored therein, the first processing receives the content from the content providing apparatus and if there are at least two content providing apparatuses which reply that the content is stored therein, the first processing unit receives the content from the nearest content providing apparatus.

The first processing calculates a distance to each of the content providing apparatus based on the position information of the content providing apparatus to determined the nearest content providing apparatus.

The interrogating interrogates a content providing server on a public IP network whether the content is stored.

If the content is not stored in at least one second content providing apparatus, the first processing receives the content from the content providing server and if the content is stored in another content providing apparatus in the same cluster, requests the content providing server to stop delivering the content.

The second processing counts the number of transmitting the content whenever the content is transmitted to the user terminal.

The second processing records an un-stored content which is not stored, in a content storing list, as a first content, if a reply is received from at least two content storing apparatuses which belong to the same cluster that the un-stored content is possessed therein, changes and records the un-stored content in the content storing list as a second content, and if a reply is received from at least two content storing apparatus which belong to the same cluster that the un-stored content is possessed therein, changes and records the un-stored content in the content storing list as a second content.

The content providing method further includes, after the second processing, third processing to delete a content which is being stored, delete the second content first using the content storing list and then delete a third content later. The third processing may be performed at any time if there is a stored content so that it is not limited to be performed after the second processing.

If there are at least two second contents, the third processing deletes a content whose number of times of delivery to the user terminal is smaller, first.

The present invention suggests a content providing system, including: a user terminal configured to request a content; a first content providing device configured to if the request of the content is received, determine whether the content is stored and if the content is stored, transmit the stored content to the user terminal, and a second content providing apparatus configured to form a cluster with the first content providing device, determined whether the content is stored in accordance with the request of the first content providing apparatus when the content is not stored in the first content providing apparatus, and if the content is stored, transmits the content to the user terminal through the first content providing apparatus.

If the content is stored at least two of second content providing apparatuses, the first content providing apparatus calculates a distance to the second content providing apparatus based on position information of the second content providing apparatus to receive the content from the second content providing apparatus which is in the nearest position.

The content providing system may further include a content providing server which is a server on a public IP network, configured to determine whether the content is stored in accordance with the request of the first content providing device when the content is not stored in the first content providing apparatus and if the content is stored, transmits the content to the user terminal through the first content providing apparatus; and a gateway configured to connect the first content providing apparatus and the content providing server, if the content is stored in the second content providing apparatus, stop the content providing server transmitting the content to the first content providing apparatus.

The gateway is a third content providing apparatus which belongs to the same cluster as the first content providing apparatus and the second content providing apparatus.

According to the configuration of the present invention, a user tightly coupled cluster to deliver a content may be configured. The present invention provides a complete distributed content storing and providing architecture in order to exclude content synchronizing and request routing processes to solve the problems of the content delivery network of the related art. Further, the user tightly coupled cluster suggested in the present invention locally distributes popular contents so that the content is not directly serviced from the content server and thus a bottleneck phenomenon occurring in a specific network device of an access network or a backhaul network is reduced to reduce a cost for maintaining and installing more network of a network service provider. In a complete distributed content storing and supplying architecture, even when an error occurs in a part of servers, the content is delivered from another server so that a high availability may be achieved.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 9 is an operational flowchart of a priority based LRU method using a content status It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present disclosure will be described in detail with reference to the accompanying drawings. In the figures, even though the parts are illustrated in different drawings, it should be understood that like reference numbers refer to the same or equivalent parts of the present invention throughout the several figures of the drawing. Further, if it is considered that description of related known configuration or function may cloud the gist of the present invention, the description will be omitted. Further, hereinafter, exemplary embodiment of the present disclosure will be described. However, it should be understood that a technical spirit of the invention is not limited to the specific embodiments, but may be changed or modified by those skilled in the art.

Figure 1:
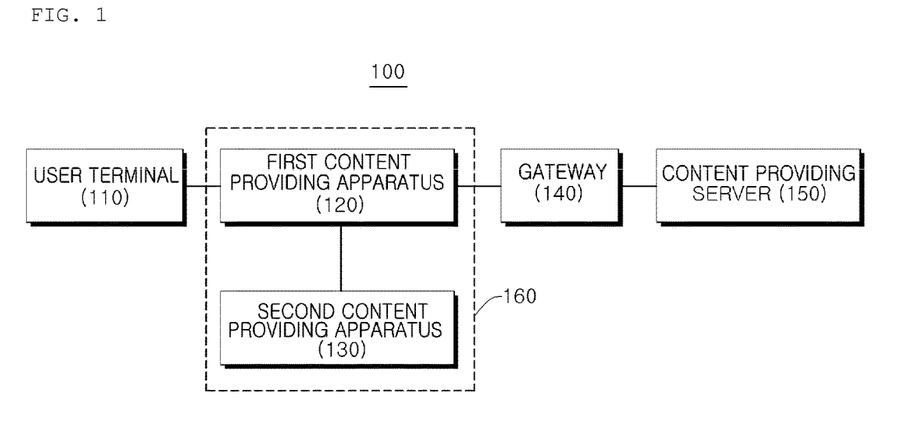
FIG. 1 is a block diagram schematically illustrating a content providing system according to an exemplary embodiment of the present invention.

FIG. 1 is a block diagram schematically illustrating a content providing system according to an exemplary embodiment of the present invention. Referring to FIG. 1, a content providing system 100 includes a user terminal 110, a first content providing apparatus 120, and a second content providing apparatus 130. The content providing system 100 may further include a gateway 140 and a content providing server 150.

The user terminal 110 performs a function which requests a content. The user terminal 10 may be implemented as a terminal which is carried by a user or designated by the user.

When a request for a content is received, the first content providing apparatus 120 determines whether the content is stored. If the content is stored, the first content providing apparatus 120 transmits the stored content to the user terminal. The first content providing apparatus 120 may be implemented by a normal server.

If the content is not stored in the first content providing apparatus 120, the second content providing apparatus 130 determines whether the content is stored in accordance with the request of the first content providing apparatus 120. If the content is stored, the second content providing apparatus 130 transmits the content to the user terminal 110 through the first content providing apparatus 120. The second content providing apparatus 130 forms a cluster 160 together with the first content providing apparatus 120 and at least one second content providing apparatus is provided in the exemplary embodiment. The second content providing apparatus 130 may be implemented by a normal server, together with the first content providing apparatus 120.

The content providing server 150 is a server on a public IP network. If the content is not stored in the first content providing apparatus 120, the content providing server 150 determines whether the content is stored in accordance with the request of the first content providing apparatus 120. If the content is stored, the content providing server 150 transmits the content to the user terminal 110 through the first content providing apparatus 120. However, the content providing server 150 transmits the content only when the content is not stored in the second content providing apparatus 130.

The gateway 140 is a configuration which connects the first content providing apparatus 120 and the content providing server 150. If the content is stored in the second content providing apparatus 130, the gateway 140 stops the content providing server 150 transmitting the content to the first content providing apparatus 120.

In the meantime, the gateway 140 may be implemented by a third content providing apparatus which belongs to the same cluster 180 as the first content providing apparatus 120 and the second content providing apparatus 120.

Figure 2:
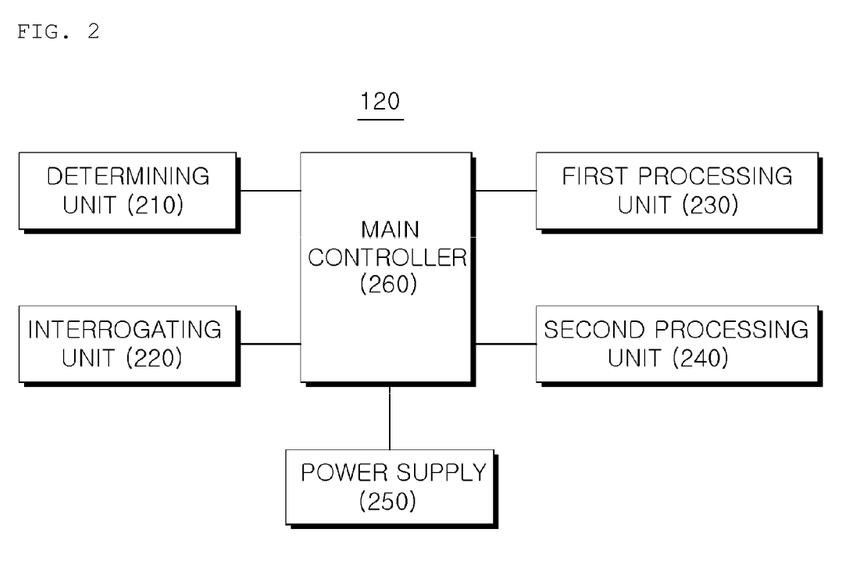
FIG. 2 is a block diagram schematically illustrating an internal configuration of a first content providing apparatus illustrated in FIG. 1.
Figure 3:
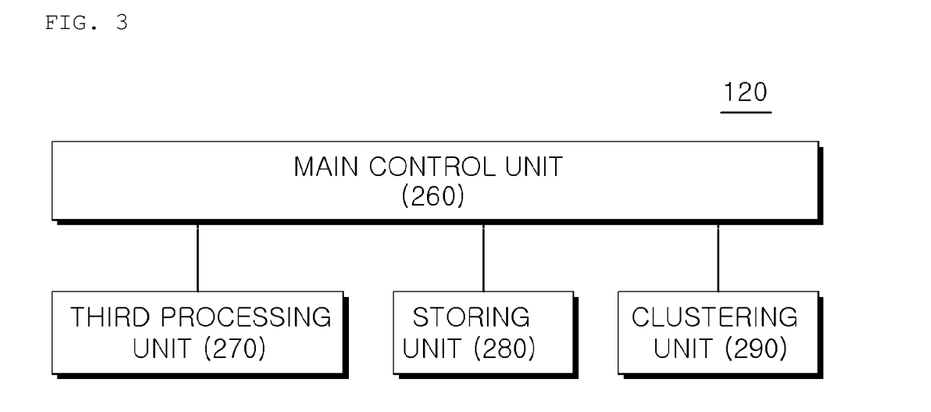
FIG. 3 is a block diagram illustrating a configuration which is added to the first content providing apparatus illustrated in FIG. 2.

Next, the first content providing apparatus 120 provided in the content providing system 100 of FIG. 1 will be described. FIG. 2 is a block diagram schematically illustrating an internal configuration of a first content providing apparatus illustrated in FIG. 1. FIG. 3 is a block diagram illustrating a configuration which is added to the first content providing apparatus illustrated in FIG. 2.

Referring to FIG. 2, the first content providing apparatus 120 includes a determining unit 210, an interrogating unit 220, a first processing unit 230, a second processing unit 240, a power supply 250, and a main controller 260.

The determining unit 210 determines whether a content which is requested through the user terminal 110 is stored. The determining unit 210 is a component based on a content list management and inspection unit 522 which will be described below with reference to FIG. 6.

If the content is not stored, the interrogating unit 220 interrogates the second content providing apparatus whether the content is stored. In the above description, the second content providing apparatus refers to a content providing apparatus in the same cluster which is different from the first content providing apparatus 120.

The interrogating unit 220 also interrogates the content providing server 150 on the public IP network whether the content is stored. The interrogating function of the interrogating unit 220 may be performed simultaneously when the interrogating unit 220 interrogates the second content providing apparatuses but the interrogating function may be performed after a reply indicating that stores the content is not received from the second content providing apparatus within a predetermined time.

The first processing unit 230 receives the content from a content providing apparatus which replies that the content is stored therein, among the second content providing apparatuses. If there is one content providing apparatus which replies that the content is stored therein, the first processing unit 230 receives the content from the content providing apparatus and if there are at least two content providing apparatuses which reply that the content is stored therein, the first processing unit 230 receives the content from the nearest content providing apparatus. The first processing unit 230 calculates the distance from the first processing unit to the content providing apparatus based on position information of each of the content providing apparatuses to determine the nearest content providing apparatus.

If the content is not stored in at least one second content providing apparatus, the first processing unit 230 receives the content from the content providing server 150. In contrast, if the content is stored in at least one second content providing apparatus, the first processing unit 230 requests the content providing server 150 to stop delivering the content.

If the content is stored, the second processing unit 240 delivers the content to the user terminal 110. If the content is not stored, the second processing unit 240 receives and stores the content from the content providing apparatus which replies that the content is stored therein and delivers the content to the user terminal 110.

The second processing unit 240 counts the number of times of delivering the content whenever the content is delivered to the user terminal 110. The second processing unit 240 considers a content whose accumulated number of times delivering the content during a predetermined period is equal to or larger than a reference value as a popular content to the user and stores only this content. Therefore, even though a storage capacity of the content providing apparatus is small, a storing unit may be efficiently operated.

Figure 6:
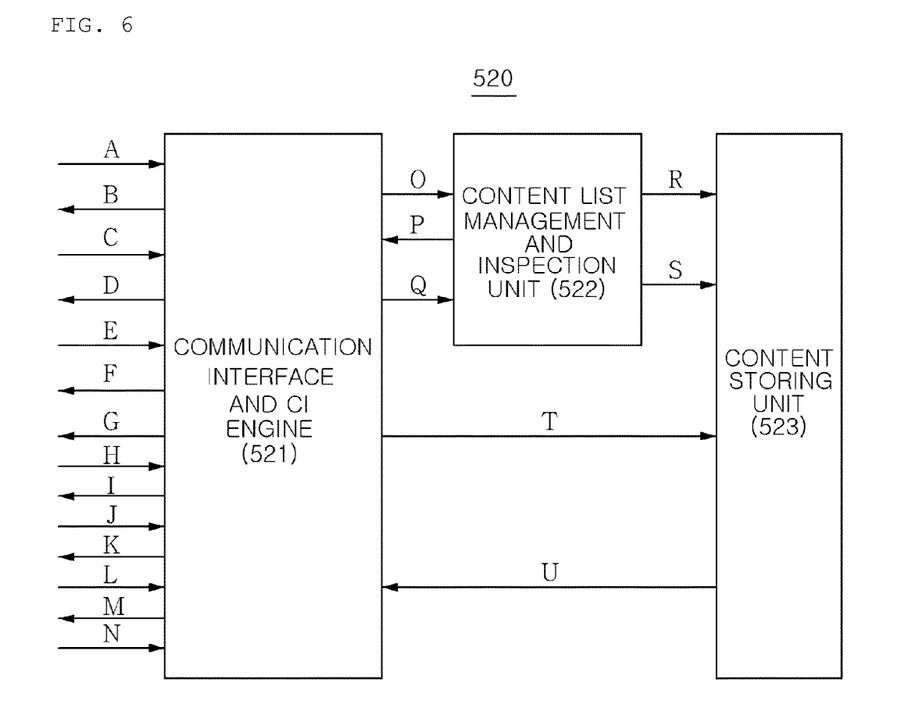
FIG. 6 is a block diagram illustrating an internal configuration of a CCE which configures the system of FIG. 5.

The above-described interrogating unit 220, the first processing unit 230, and the second processing unit 240 is components obtained by modularizing a partial function of a communication interface and CI (content inspection) engine 521 with reference to FIG. 6.

In the meantime, the second processing unit 240 records an un-stored content which is not stored, in a content storing list, as a first content. Further, if the second processing unit 240 receives a reply from at least two content storing apparatuses which belong to the same cluster that the un-stored content is possessed therein, the second processing unit 240 receives and stores the un-stored content and records the un-stored content in the content storing list as a second content. Further, if the second processing unit 240 receives a reply from at least two content storing apparatuses which belong to the same cluster that the un-stored content is possessed therein, the second processing unit 240 changes and records the un-stored content in the content storing list as a second content. These functions of the second processing unit 240 will be described in detail with reference to FIGS. 8 and 9.

The power supply 250 supplies a power to individual components of the first content providing apparatus 120.

The main controller 260 controls an entire operation of the individual components of the first content providing apparatus 120.

The first content providing apparatus 120, as illustrated in FIG. 3, further includes at least one of a third processing unit 270, a storing unit 280, and a clustering unit 290.

The third processing unit 270 deletes the content which is being stored and deletes the second content first using the content storing list and then deletes a third content later. In this case, if there are at least two second contents, the third processing unit 270 deletes a content whose number of times of delivery to the user terminal 110 is smaller, first. Such a function of the third processing unit is also applied when there are at least two third contents. The third processing unit 270 is a component obtained by modularizing a configuration which manages a content in accordance with an MES protocol and performs a priority based LRU (least recently used) method. Detailed description of this configuration will be described below with reference to FIGS. 8 and 9.

The storing unit 280 stores the content. The storing unit 280 is a component based on a content storing unit 523 of FIG. 6.

The clustering unit 290 creates a cluster in cooperation with other content providing apparatus or registers oneself an already configured cluster. The clustering unit 290 is a component obtained by modularizing a partial function of the communication interface and CI engine 521 of FIG. 6.

Figure 4:
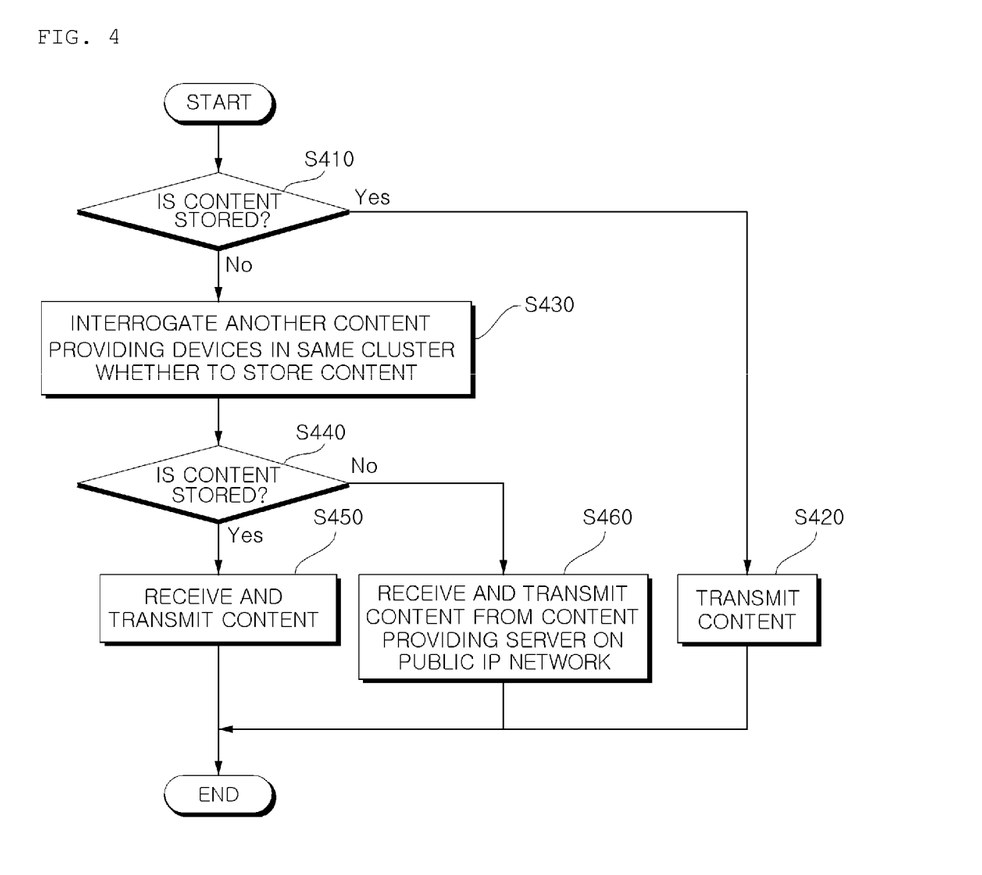
FIG. 4 is a flowchart schematically illustrating a content providing method of the first content providing apparatus according to an exemplary embodiment of the present invention.

Next, a content providing method of the first content providing apparatus 120 which has been described with reference t FIGS. 1 to 3 will be described. FIG. 4 is a flowchart schematically illustrating a content providing method of the first content providing apparatus according to an exemplary embodiment of the present invention. Hereinafter, the exemplary embodiment will be described with reference to FIGS. 1 and 4.

First, in step S410, the determining unit 210 determines whether a content which is requested through the user terminal 110 is stored. If the content is stored, in step S420, the second processing unit 240 delivers the content to the user terminal 110. In contrast, if the content is not stored, in step S430, the interrogating unit 220 interrogates the second content providing apparatus whether the content is stored. In the meantime, the interrogating unit 220 also interrogates the content providing server 150 on the public IP network whether the content is stored.

After step S430, if there is a content providing apparatus which replies that the content is stored therein, among the second content providing apparatuses in step S440, the first processing unit 230 receives the content from the content providing apparatus. Thereafter, in step S450, the second processing unit 240 stores the received content and delivers the content to the user terminal 110. In the meantime, in this case, the first processing unit 230 requests stopping the delivery of the content to the gateway 140 or the content providing server 150.

In contrast, if there is no content providing apparatus which replies that the content is stored, among the second content providing apparatuses in step S440, the first processing unit 230 receives the content from the content providing server 150 and then the second processing unit 240 stores the received content and transmits the content to the user terminal 110 in step S460.

In the meantime, when the third processing unit 270 deletes the content which is being stored, the third processing unit 270 deletes the second content first using the content storing list and then deletes a third content later. This function of the third processing unit 270 may be performed after steps S450 or S460 but if a content is stored therein, the function of the third processing unit 270 may be performed at any time.

Next, an exemplary embodiment of the content providing system 100 which has been described with reference to FIGS. 1 to 3 will be described with reference to FIGS. 5 to 9.

Figure 5:
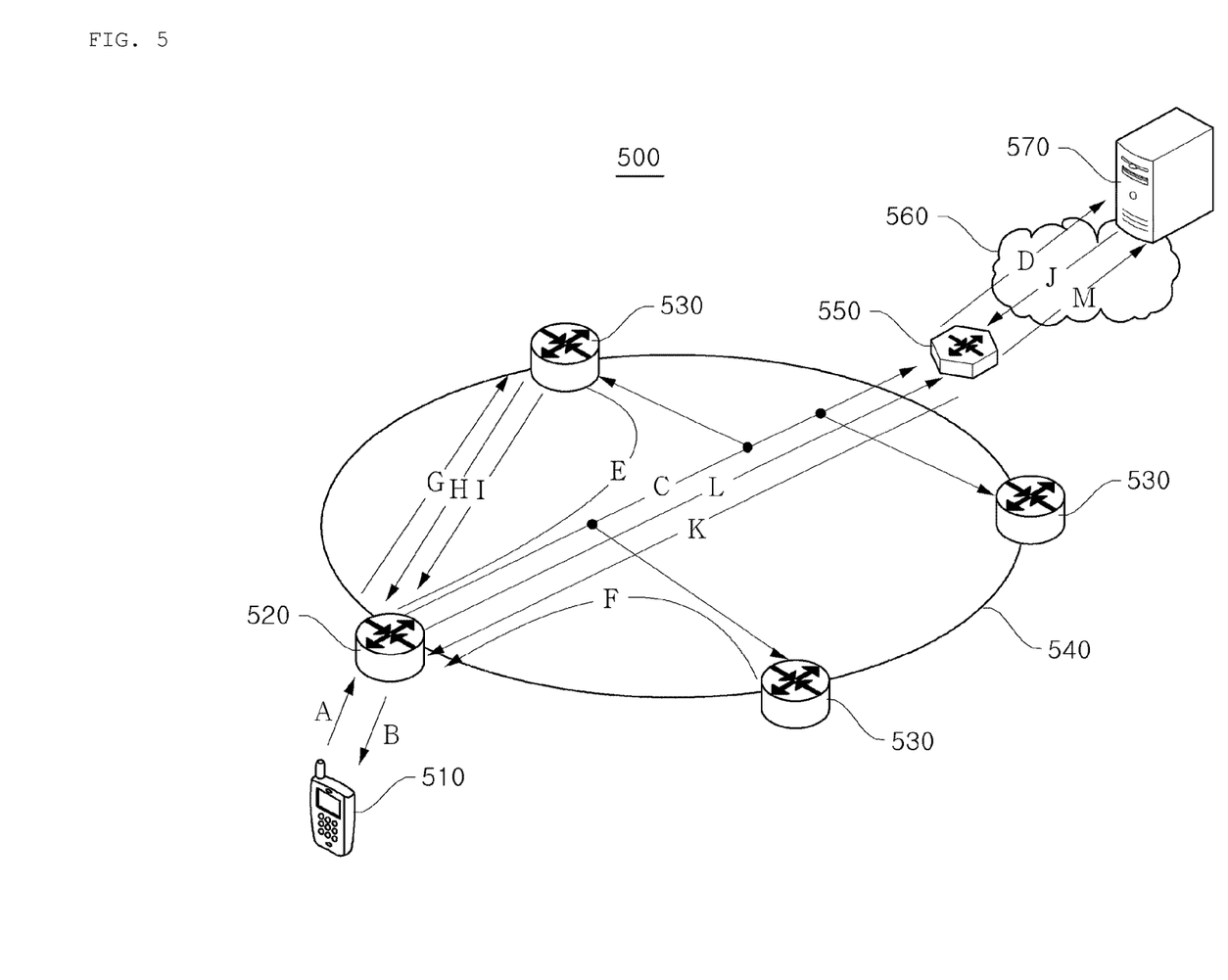
FIG. 5 is a conceptual diagram illustrating a system according to an exemplary embodiment of the present invention.

In FIG. 5, as a content delivery system in a wired or wireless network, a system which delivers the content to the user with a complete distribute structure in order to exclude the content synchronization and request routing which is designated as a problem in the existing content delivery network is suggested. The system 500 of FIG. 5 has a complete distributed structure from which the content synchronizing and request routing is excluded using a cluster which connects a user tightly coupling content server and a cluster in order to maintain a compatibility with the IP network and deliver the content.

As entering the twenty first century, a portable smart terminal such as a smart phone or a smart pad is widely propagated to the user and thus a rate of increase in an internet traffic which occurs in a wired or wireless network outstrips the installation speed of the network equipment of the communication service provider. It is expected that the traffic which is induced by the user in the mobile communication network exceeds 3.5 times bandwidth which is provided by 3G and LTE in 2015.

The suddenly increased internet traffic is mainly caused by a internet video or a mobile video. It is expected that an importance of the internet video and the mobile video in the wired or wireless network is gradually increased and exceeds 60% in 2015. The sudden increase of the internet traffic which is induced by the internet video and the mobile video is concentrated on an access network and a backhaul network, which increases a cost for installation and maintenance of a network equipment of the communication service provider.

In order to solve the above phenomenon, a content delivery network CDN is provided. The CDN is mainly provided in an edge network and gradually moves near a subscriber. Further, the CDN is provided in the access network in some cases.

The CDN is mainly configured by a content distribution server which distributes the content and a content server which provides the content to the user. The content provider delivers the content to the content server through the content distribution server and the content servers periodically repeat the synchronizing process so as to maintain the same content. If the user requests a specific content, the user receives the service for the requested content after going through a process for downloading the content after the naming resolution process through the DNS, that is, a process for selecting a content server which is the nearest to the user. The naming resolution process through the DNS is referred to as a request routing. If the request routing cannot provide DNS service or an incorrect operation occurs due to various reasons, the user cannot receive a normal content service. Further, the content synchronizing and the request routing are traffics which are separated from the pure content service and act as a burden of the network.

As a measure for the above problem, there is a CCN (content centric network) related with information based content routing. The CCN performs routing process using the content information, so that a compatibility problem with the existing IP network occurs. The CCN has a problem in that information related to a required content is propagated to all neighbor nodes so that as the number of requesting contents is increased, the size of the routing table is increased.

In order to solve the above-mentioned problem, the present invention suggests a system which will be described below with reference to FIGS. 5 to 9. Hereinafter, the invention will be described in detail.

FIG. 5 illustrates a system 500 to which content routing to deliver the content is applied according to an embodiment of the present invention.

In this invention, in order to solve problems of an overhead in accordance with the synchronization of the content servers and the DSN based request routing in order to fine a position of the content, a cluster content engine (CCE) to which a content routing technique is applied in order to deliver the content between the content servers in the form of a completed distribution structure is suggested.

A content cluster 500 includes a plurality of CCEs (cluster content engines), is configured in the form of a cluster in a position closest to the user, and stores a popular content to efficiently provide the content to the user even in a small storage. Further, a content which is not included in the content cluster is preferentially received from the CCE in the cluster 500 so that a burden of the public IP network 560 caused by the content delivery may be minimized. When the CCE receives the content which is not possessed in the CCE from another CCE or the content server 570 which is present in a public IP network 560 to deliver the content to the user, the CCE simultaneously stores the content its own storage so that the content is efficiently delivered with a higher content Hit rate which is a probability of containing the content requested by the user.

When the user requests a user content through the terminal 510 in order to watch a desired content (A), a first CCE 520 which is connected to the terminal 510 checks whether the content is present in its own storage. If the content is present, the first CCE provides the user content (B).

If the content is not present, the first CCE 520 transmits a content request broadcasting message in order to request the content to another CCEs in the cluster 540, that is, second CCEs 530 and a content server 570. The second CCEs 530 which receive the content request broadcasting message and the content server 570 which is present in the public IP network 560 check whether the requested content is present.

Among the second CCEs 530 which receive the content request broadcasting message, a CCE which has a requested content transmits a content response message in order to notify the first CCE 520 that the content is present. The content response message includes position information of the CCE so as to be used for a CCE selecting process that a CCE (that is, the first CCE) which requests the content receives the content from a CCE which has the content. The first CCE 520 which receives the content response selects a CCE which is the closest the first CCE 520 among the CCEs which transmit the content response using the position information of the CCE included in the content response to minimize the transmission delay time.

When the CCE selecting process which receives the content ends, the content transmission path is secured between the content transmitting/receiving CCEs through the connection process. Such a connection process is configured by a connection request G and a connection response H. When the CCEs are interconnected through the connection process, the content is transmitted (I) If a path to deliver the content is connected between the two CCEs 520 and 530, the first CCE 510 which requests the content provides the received content as a user content (B). In this case, the first CCE 510 delivers the content to the user and simultaneously stores the content in its own storage. Such a content storing process increases a spatial and time locality of the content so as to increase a content hit rate so that the network overhead is minimized and the content is efficiently delivered.

Simultaneously with the above process, a service gateway 550 which receives the content request broadcasting message delivers the message to the content server 570 (D). Simultaneously with the process of checking whether the second CCEs 530 possesses the content, the server content request message is transmitted to the content server 570 to minimize a service delay time occurring when the corresponding content is not present in all second CCEs 530 of the cluster 540.

The content server 570 which receives the server content request message notifies that the content is present and transmits the server content response and transmission message which transmits the content (J). Even though the server content response and transmission message is divided into a server content response message and a server content transmission message, for the convenience of the description, the server content response and transmission message is represented as one message. Further, the server content transmission message is a stream for transmitting the requested content.

The service gateway 550 which receives the server content response and transmission message transmits the corresponding content to the first CCE 510 using the server content message (K). When the service gateway 550 receives a cluster content hit message indicating that the requested content is present in the cluster 540 (L), no more content needs to be received from the content server 570. Therefore, the service gateway 550 transmits a server content transmission stop request message (M) to finish the content transmission process with the content server 570 to minimize unnecessary service delay time and waste of a bandwidth.

As described above, according to the embodiment of the present invention, a complete distribution structure in which the CCEs which forms the cluster 540 share the requested content is provided so as to exclude the content synchronization and the request routing process.

FIG. 6 illustrates an internal structure of the first CCE 520 which forms the cluster 540. It is obvious that the internal structure illustrated in FIG. 6 is also applied to the second CCE 530.

The first CCE 520 includes a communication interface and CI (content inspection) engine 521, a content list management and inspection unit 522, and a content storage unit 523. The communication interface and CI engine 521 interfaces with the cluster 540 and delivers the content which is requested by the user. The content list management and inspection unit 522 inspects and manages whether the content requested by the user is present. The content storing unit 523 stores the content.

If the user content request message A or the content request broadcasting reception message C is received, the communication interface and CI engine 521 performs an CI (content inspection) process in order to extract content information which identifies the content requested by the user. The content information extracted through the CI process is delivered to the content list management and inspection unit 522 (O) to inspect the content list stored in the content storing unit 523 and inspect whether the corresponding content is present. If the corresponding content is present, the content list management and inspection unit 522 transmits the content reading message to the content storing unit 523 (R) and the content storing unit 523 which receives the content reading message transmits the content reading message through the stored content transmission message as a stream to the communication interface and CI engine 521.

When the stored content transmission is caused by the user content request (A), since the content is requested by the user, the communication interface and CI engine 521 provides the requested content to the user through the user content providing message (B). If the stored content transmission message is caused by the content request broadcasting reception message (C), since the content is requested by other CCE, the communication interface and CI engine transmits the content response transmission message to the content request CCE in order to notify the content request CCE that the communication interface and CI engine has the requested content (F). The content response transmission message in the content request CCE is input as the content response reception message (E).

The content request CCE which receives the content response transmission message from a plurality of CCEs selects a CCE which receives the content using the position information of the CCE which has the content and transmits the connection request transmission message to the corresponding CCE (I). The CCE which receives the connection request transmission message sends a connection response reception message (J) to set a passage through which the content is exchanged between two CCEs. With respect to the content request CCE outputs the connection message for connecting the two CCEs as a connection request transmission message (I) and a connection response reception message (L) and the CCE which has the content outputs the connection message as the connection request reception message (J) and the connection response transmission message (K). After the path is connected between the two CCEs, the CCE which has the content delivers the content to the content request CCE in the form of a stream (G). The CCE which receives the requested content provides the content which is requested through the user content providing message to the user. If the content response message for the requested content is received (E), the content request CCE transmits the cluster content hit message to the service gateway 550 (M) so that the content server 570 does not transmit the content any more to minimize the waste of bandwidth of the public IP network.

If the content requested by the user is not included in its own content list, the content list management and inspection unit 522 the unidentified content message to the communication interface and CJ engine 521 (P) to broadcast the content request broadcasting transmission message to the cluster 540 and the content server 570 (D). If the requested content is present in the CCE of the cluster 540, the content requested through the above processes is acquired. If the requested content is not present in the CCE of the cluster 540, the communication interface and CI engine 521 which receives the server content reception message N received from the service gateway 550 provides the requested message to the user in the form of the stream through the user content providing message.

If the content requested by the user is related to the unidentified content, the content requested by the user is provided to the user and stored in its own content storing unit 523 in order to improve the content hit rate.

The communication interface and CI engine 521 transmits (Q) a content update massage to the content list management and inspection unit 522 to add the content to the content list. The content update massage means massage for updating content related to the unidentified content. The communication interface and CI engine 521 changes the content reception message (H) or the server content reception message (N) into a reception content stream to transmit the reception content stream to the content storing unit 523 in order to store the added content in the content storing unit 523.

Simultaneously, the content list management and inspection unit 522 transmits the content writing message to the content storing unit 523 to store the reception content stream in the content storing unit 523. The content storing unit 523 which receives the content writing message receives the reception content stream message (T) to transmit the content requested by the user to the user (U) and store the content in its own storage. The content storing unit 523 stores the content which is not included in the content storing unit 523 to improve the content hit rate. The improvement of the content hit rate may minimize the waste of bandwidth of the IP network 560 and the cluster 540 and minimize the content delivery time to improve the content service quality.

Figure 7:
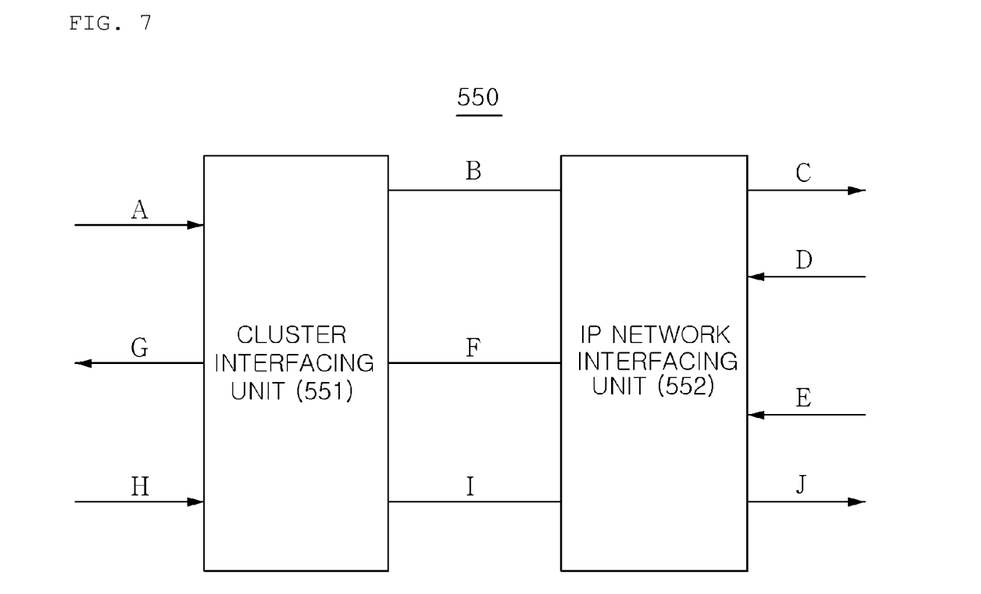
FIG. 7 is a block diagram illustrating an internal configuration of a service gateway which configures the system of FIG. 5.

FIG. 7 illustrates an internal functional block of the service gateway 550. The service gateway 550 according to an embodiment of the present invention interconnects the content cluster 540 and the public IP network 560 to each other and minimizes the consumed bandwidth of the public IP network 560 in order to deliver the content to the user.

The service gateway 550 includes a cluster interfacing unit 551 and an IP network interfacing unit 552. The cluster interfacing unit 551 receives the content request from the content cluster 540 and delivers the content to the content cluster 540. The IP network interfacing unit 552 implements the interworking with the public IP network 560 in which the content server 570 is located.

The cluster interfacing unit 551 which receives the server content request broadcast (A) from the cluster 540 transmits the cluster-server content request broadcasting message (B) to the IP network interfacing unit 552 in order to request the content to the content server 570. The IP network interfacing unit 552 which receives the cluster-server content request broadcasting message transmits the server content request message (C) to the content server 570. The content server 570 which receives the server content request message transmits the server content response message (D) indicating the presence of the content to the IP network interfacing unit 552 and then transmits the content requested in the form of stream to the service gateway 550 using the server content reception message (E).

The IP network interfacing unit 552 which receives the server content reception message delivers the content to the cluster interfacing unit 551 using the server content stream message (F). The cluster interfacing unit 551 delivers the content to the content request CCE using the server content transmission message (G).

In the course of receiving the requested content from the content server 570, if the cluster interfacing unit 551 receives a cluster content hit message (H), the cluster interfacing unit 551 transmits the cluster-server content hit message (I) to the IP network interfacing unit 552 in order to save the waste of the bandwidth of the public IP network 560. The IP network interfacing unit 552 which receives the cluster-server content hit message transmits the server content transmission stop request message (J) to the content server 70 so that the content server 570 stops the transmission of the stream for the content.

The service gateway 550 may be combined with the CCE in the cluster 540. If the service gateway is combined, one of the CCEs in the cluster 540 serves as a service gateway.

Figure 8:
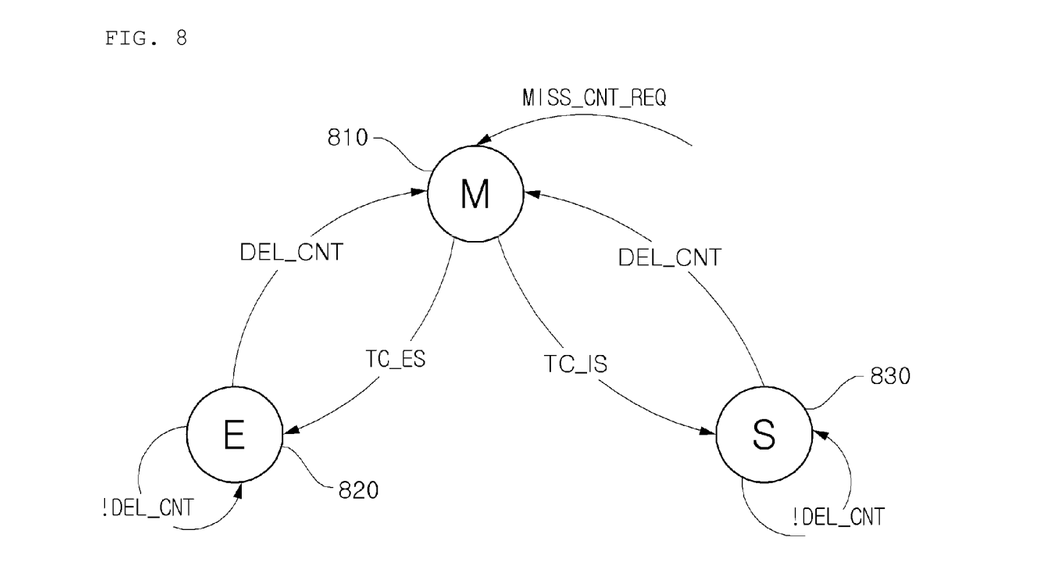
FIG. 8 is a content status management transitional view of an MES protocol which manages a content stored in CCE.

FIG. 8 is a content status management transitional view of an MES protocol which manages a content stored in CCE.

M (missed content) 810 refers to a content which is not present in the CCE. S (shared content) 830 refers to a content which is present in two or more CCEs. S 830 is obtained when the content is copied from another CCE in the cluster 540. E (exclusive content) 820 refers to a content which is copied from the content server 570 and the content means one copied content which is present in the cluster 540 or a content which is copied by another CCE.

If the content requested by the user is not present in the CCE, the status of the content is maintained at M 810 by MISS_CUT_REQ. If the content which is maintained at M 810 state is copied from another CCE of the cluster 540, the content is changed into the S 830 state by a TC-IS signal. If the content which is maintained at M 810 is not present in all of the CCEs of the cluster 540 and cannot copied from the content server 570, the content is changed into an E 820 state by the TC_ES signal.

If the content which is maintained at the E 820 state and the S 830 state is not stored in the content storing unit 523 of the CCE any more, an existing content needs to be deleted in order to store a new content. The content which has the E 820 state and S 830 state receiving !DEL_CNT signal is changed into the M 810 state by the DEL_CNT signal. The content which is changed into the M 810 status is deleted from the list which is managed by the content list management and inspection unit 522 and the data is deleted from the content storing unit 523. A priority based LRU method using a content status to select a content to be deleted according to an embodiment of the present invention will be described in detail with reference to FIG. 9.

Figure 9:
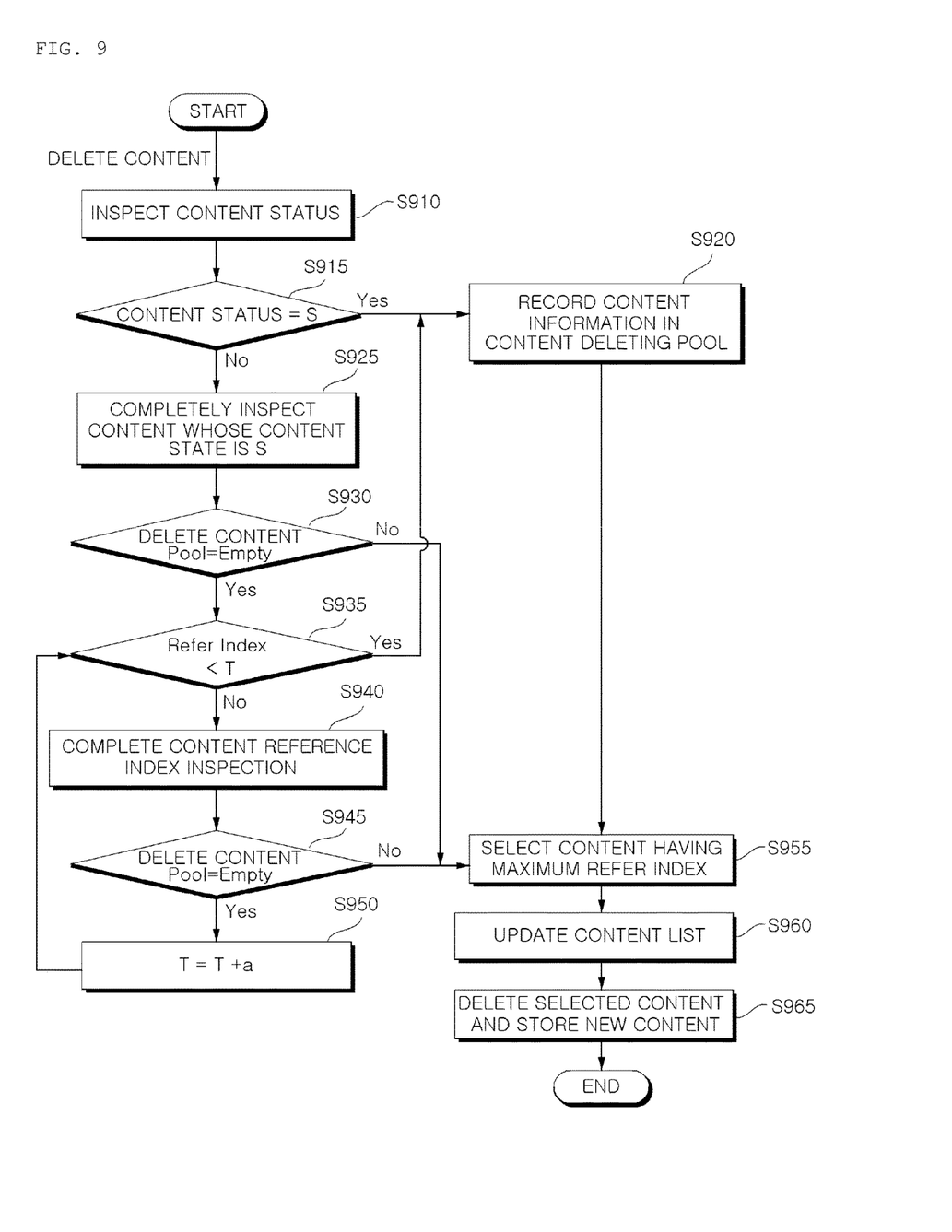

FIG. 9 illustrates an operational flowchart of a priority based LRU method using a content status according to an embodiment of the present invention.

The priority based LRU method using a content status inspects the status of the content stored in the content storing unit 523 and applies a priority to a content having an S status. If contents have the same content status, the LRU (least recently used) method is used to select a content which is less requested by the user to select a content to be deleted. The LRU method is performed by the CCEs.

If a new content cannot stored in the content storage, a part of existing contents needs to be deleted. In this embodiment, a content status inspecting process S910 is performed to select the content to be deleted and store information on a content whose content status is an S status S910 in a content deleting pool (S920).

Even though the content in the S status is completely inspected (S925), if the content deleting pool is empty (S930), it means that all contents stored in the content storage are in E status. The content related to the E state is selected as a content to be deleted by the LRU method. Therefore, if a refer index value is T or lower (S935), the content information in the E state is recorded in the content deleting pool (S920). When the refer index value is T or lower, it means that the content has not been requested by the user for a predetermined time. T is a threshold value and may be set by an operator. After completing the inspection of the content reference index (S940), if the content deleting pool is empty (S945), a content group to be deleted is not selected. Therefore, a predetermined value a is added to adjust a threshold value of T to select the content group to be deleted (S950).

If the content group to be deleted is selected by the S status content inspection S925 and the refer index inspection S940, information on the content which belongs to the selected group is inspected to select a content having the maximum refer index (S955). If the content to be deleted is selected by the above process, the content information is deleted from the content list of the content list management and inspection unit 522 and the content information requested by the user is updated (S960). Thereafter, the selected content is deleted and the content requested by the user is stored (S965).

Even though all components of the exemplary embodiment may be combined as one component or operates to be combined, the present invention is not limited to the exemplary embodiment. In other words, all components may be selectively combined to be operated within a scope of the present invention. Further, all components may be implemented as one independent hardware but a part or all of the components are selectively combined to be implemented as a computer program which includes a program module which performs a part or all functions combined in one or plural hardwares. Further, such a computer program may be stored in a computer readable media such as a USB memory, a CD disk, or a flash memory to be read and executed by a computer to implement the exemplary embodiment of the present invention. The recording media of the computer program may include a magnetic recording medium, an optical recording medium, or a carrier wave medium.

If it is not contrarily defined, all terms used herein including technological or scientific terms have the same meaning as those generally understood by a person with ordinary skill in the art. A generally used terminology which is defined in a dictionary may be interpreted to be equal to a contextual meaning of the related technology but is not interpreted to have an ideal or excessively formal meaning, if it is not apparently defined in the present invention.

The above description is illustrative purpose only and various changes, modifications, and variations become apparent to those skilled in the art within a scope of an essential characteristic of the present invention. Therefore, as is evident from the foregoing description, the exemplary embodiments and accompanying drawings disclosed in the present invention do not limit the technical spirit of the present invention. The scope of the present invention may be interpreted by the appended claims and the technical spirit in the equivalent range is intended to be embraced by the invention.

What is claimed is:

1. A content providing apparatus, comprising:
   a determining unit configured to determine whether a content requested by a user terminal is stored in the content providing apparatus;
   a clustering unit configured to create a cluster in cooperation with other content providing apparatuses or register the content providing apparatus in an already configured cluster;
   an interrogating unit configured to, when the content is not stored in the content providing apparatus, interrogate the other content providing apparatuses in the same cluster whether the content is stored in each of the other content providing apparatuses;
   a first processing unit configured to receive the content from a second content providing apparatus among the other content providing apparatuses when the second content providing apparatus replies that the content is stored therein; and
   a second processing unit configured to transmit the stored content to the user terminal when the content is stored in the content providing apparatus, and, when the content is not stored in the content providing apparatus, store the received content from the second content providing apparatus and transmit the received content to the user terminal,
   wherein the interrogating unit further interrogates a content providing server on a public IP network via a service gateway whether the content is stored when the content is not stored in the content providing apparatus,
   wherein when the content is not stored in at least one second content providing apparatus, the first processing unit receives the content from the content providing server, and when the content is stored in at least one second content providing apparatus in the same cluster, requests the content providing server to stop delivering the content to minimize a service delay time and waste of a bandwidth, and
   wherein a plurality of content providing apparatuses in the same cluster store and share locally distributed contents and provide preferentially the content requested by the user.

2. The content providing apparatus of claim 1, wherein when there is one second content providing apparatus which replies that the content is stored therein, the first processing unit receives the content from the one second content providing apparatus, and when there are at least two second content providing apparatuses which reply that the content is stored therein, the first processing unit receives the content from the nearest content providing apparatus among the at least two second content providing apparatuses.

3. The content providing apparatus of claim 2, wherein the first processing unit calculates a distance to each of the at least two second content providing apparatuses based on position information of each of the at least two second content providing apparatuses, and determines, among the at least two second content providing apparatuses, a second content providing apparatus having a shortest distance as the nearest content providing apparatus.

4. The content providing apparatus of claim 1, wherein the second processing unit counts the number of transmitting the content whenever the content is transmitted to the user terminal.

5. The content providing apparatus of claim 2, wherein the second processing unit records an un-stored content which is not stored in the content providing apparatus, in a content storing list, as a first content, if a reply is received from at least two second content storing apparatuses which belong to the same cluster that the un-stored content is possessed therein, changes and records the un-stored content in the content storing list as a second content, and if a reply is received from one second content storing apparatus which belongs to the same cluster or the content providing server that the un-stored content is possessed therein, changes and records the un-stored content in the content storing list as a third content.

6. The content providing apparatus of claim 5, further comprising:
   a third processing unit configured to delete contents in an order of a content which is being stored, the second content, and the third content using the content storing list.

7. The content providing apparatus of claim 6, wherein if there are at least two second contents, the third processing unit deletes a content whose number of times of delivery to the user terminal is smaller, first.

8. A content providing method performed by a first content providing apparatus, comprising:
   determining whether a content requested by a user terminal is stored in the first content providing apparatus;
   creating a cluster in cooperation with other content providing apparatuses or register the first content providing apparatus in an already configured cluster;
   interrogating, when the content is not stored in the first content providing apparatus, the other content providing apparatuses in the same cluster whether the content is stored in each of the other content providing apparatuses;
   first processing to receive the content from a second content providing apparatus among the other content providing apparatus when the second content providing apparatus replies that the content is stored therein; and
   second processing to transmit the stored content to the user terminal when the content is stored in the first content providing apparatus and, when the content is not stored in the first content providing apparatus, store the received content from the second content providing apparatus and transmit the received content to the user terminal,
   wherein the interrogating comprises further interrogating a content providing server on a public IP network via a service gateway whether the content is stored when the content is not stored in the first content providing apparatus,
   wherein when the content is not stored in at least one second content providing apparatus, the first processing further comprises receiving the content from the content providing server, and when the content is stored in at least one second content providing apparatus in the same cluster, the first processing further comprises requesting the content providing server to stop delivering the content, to minimize service delay time and waste of a bandwidth, and wherein a plurality of content providing apparatuses in the same cluster store and share locally distributed contents and provide preferentially the content requested by the user.

9. The content providing method of claim 8, wherein when there is one second content providing apparatus which replies that the content is stored therein, the first processing comprises receiving the content from the one second content providing apparatus, and when there are at least two second content providing apparatuses which reply that the content is stored therein, the first processing comprises receiving the content from the nearest content providing apparatus among the at least two second content providing apparatuses.

10. The content providing method of claim 8, wherein the second processing comprises recording an un-stored content which is not stored in the first content providing apparatus, in a content storing list, as a first content, if a reply is received from at least two second content storing apparatuses which belong to the same cluster that the un-stored content is possessed therein, changes and records the un-stored content in the content storing list as a second content, and if a reply is received from one second content storing apparatus which belongs to the same cluster or the content providing server that the un-stored content is possessed therein, changes and records the un-stored content in the content storing list as a third content.

11. The content providing method of claim 10, further comprising:

third processing to delete contents in an order of a content which is being stored in the first content providing apparatus, the second content, and the third content first using the content storing list, wherein the second processing comprises counting the number of transmitting the content whenever the content is transmitted to the user terminal, and if there are at least two second contents, the third processing comprises deleting a content whose number of times of delivery to the user terminal is smaller, first.

12. A content providing system, comprising:

a user terminal configured to request a content;

a first content providing apparatus configured to, when the request of the content is received, determine whether the content is stored therein, when the content is stored, transmit the stored content to the user terminal, and create a cluster in cooperation with other content providing apparatuses or register oneself in an already configured cluster;

at least one second content providing apparatus configured to form a cluster with the first content providing apparatus, determine whether the content is stored therein in response to a request from the first content providing apparatus, and when the content is stored therein, transmit the content to the user terminal through the first content providing apparatus, a content providing server, which is a server on a Public IP network, configured to determine whether the content is stored therein in response to the request from the first content providing apparatus when the content is not stored in the first content providing apparatus, and when the content is stored therein, transmit the content to the user terminal through the first content providing apparatus; and a gateway configured to connect the first content providing apparatus and the content providing server, and when the content is stored in at least one second content providing apparatus, request the content providing server to stop transmitting the content to the first content providing apparatus, wherein a plurality of content providing apparatuses in the same cluster store and share locally distributed contents and provide preferentially the content requested by the user.

13. The content providing system of claim 12, wherein when the content is stored in at least two second content providing apparatuses included in the other content providing apparatuses in the same cluster, the first content providing apparatus calculates a distance to each of the at least two second content providing apparatuses based on position information of each of the at least two second content providing apparatuses to receive the content from a second content providing apparatus which is in the nearest position from the first content providing apparatus.

14. The content providing system, of claim 12, wherein the gateway is a third content providing apparatus which belongs to the same cluster as the first content providing apparatus and the at least one second content providing apparatus.

* * * * *